US009813345B1

(12) United States Patent
Krishna et al.

(10) Patent No.: US 9,813,345 B1
(45) Date of Patent: *Nov. 7, 2017

(54) OFFLOAD OF DATA TRANSFER STATISTICS FROM A MOBILE ACCESS GATEWAY

(71) Applicant: Juniper Networks, Inc., Sunnyvale, CA (US)

(72) Inventors: Gopi Krishna, Saratoga, CA (US); Jagadish Grandhi, Bangalore (IN); Dinesh Bakiaraj, Sunnyvale, CA (US); Sandesh Kumar Sodhi, Bangalore (IN); Ananda Sathyanarayana, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/012,575

(22) Filed: Feb. 1, 2016

Related U.S. Application Data

(63) Continuation of application No. 13/344,325, filed on Jan. 5, 2012, now Pat. No. 9,251,535.

(51) Int. Cl.
- *H04L 12/801* (2013.01)
- *H04W 28/08* (2009.01)
- *H04L 12/835* (2013.01)
- *H04L 12/851* (2013.01)
- *H04W 88/16* (2009.01)

(52) U.S. Cl.
CPC ............. *H04L 47/14* (2013.01); *H04L 47/24* (2013.01); *H04L 47/30* (2013.01); *H04W 28/08* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 3,962,681 | A | 6/1976 | Requa et al. |
| 4,032,899 | A | 6/1977 | Jenny et al. |
| 4,600,319 | A | 7/1986 | Everett |
| 5,408,539 | A | 4/1995 | Finlay et al. |
| 5,490,252 | A | 2/1996 | Macera et al. |
| 5,509,123 | A | 4/1996 | Dobbins et al. |

(Continued)

FOREIGN PATENT DOCUMENTS

| | | |
|---|---|---|
| WO | 2007070838 A2 | 6/2007 |
| WO | 2008070549 A2 | 6/2008 |

OTHER PUBLICATIONS

"The CAIDA Web Site," www.caida.org.
(Continued)

*Primary Examiner* — Steven H Nguyen
(74) *Attorney, Agent, or Firm* — Shumaker & Sieffert, P.A.

(57) ABSTRACT

In general, techniques are described for offloading data transfer statistics from a mobile access gateway. The mobile access gateway comprises a forwarding unit. The forwarding unit comprises a packet forwarding engine (PFE). When the PFE receives a packet, the PFE updates a data transfer statistic based on a quantity of data in the packet. The data transfer statistic is initially stored in a memory of the PFE. The PFE is configured to push the data transfer statistic from the memory of the PFE to a memory of the forwarding unit.

20 Claims, 7 Drawing Sheets

(56) References Cited

U.S. PATENT DOCUMENTS

| | | | |
|---|---|---|---|
| 5,568,471 | A | 10/1996 | Hershey et al. |
| 6,011,795 | A | 1/2000 | Varghese et al. |
| 6,018,765 | A | 1/2000 | Durana et al. |
| 6,148,335 | A | 11/2000 | Haggard et al. |
| 6,182,146 | B1 | 1/2001 | Graham-Cumming |
| 6,219,706 | B1 | 4/2001 | Fan et al. |
| 6,279,035 | B1 | 8/2001 | Brown et al. |
| 6,321,338 | B1 | 11/2001 | Porras et al. |
| 6,392,996 | B1 | 5/2002 | Hjalmtysson |
| 6,499,088 | B1 | 12/2002 | Wexler et al. |
| 6,563,796 | B1 | 5/2003 | Saito |
| 6,590,898 | B1 | 7/2003 | Uzun |
| 6,594,268 | B1 | 7/2003 | Aukia et al. |
| 6,598,034 | B1 | 7/2003 | Kloth |
| 6,633,563 | B1 | 10/2003 | Lin et al. |
| 6,735,201 | B1 | 5/2004 | Mahajan et al. |
| 6,751,663 | B1 | 6/2004 | Farrell et al. |
| 6,826,713 | B1 | 11/2004 | Beesley et al. |
| 6,870,817 | B2 | 3/2005 | Dolinar et al. |
| 6,970,943 | B1 | 11/2005 | Subramanian et al. |
| 6,975,628 | B2 | 12/2005 | Johnson et al. |
| 6,983,294 | B2 | 1/2006 | Jones et al. |
| 6,985,956 | B2 | 1/2006 | Luke et al. |
| 7,054,930 | B1 | 5/2006 | Cheriton |
| 7,058,974 | B1 | 6/2006 | Maher et al. |
| 7,099,320 | B1 | 8/2006 | Salerno |
| 7,114,008 | B2 | 9/2006 | Jungck et al. |
| 7,120,931 | B1 | 10/2006 | Cheriton |
| 7,162,740 | B2 | 1/2007 | Eastlake |
| 7,185,368 | B2 | 2/2007 | Copeland |
| 7,203,740 | B1 | 4/2007 | Putzolu et al. |
| 7,301,899 | B2 | 11/2007 | Goldstone |
| 7,356,585 | B1 | 4/2008 | Brook et al. |
| 7,362,763 | B2 | 4/2008 | Wybenga et al. |
| 7,478,155 | B2 | 1/2009 | Couturier et al. |
| 7,496,955 | B2 | 2/2009 | Akundi et al. |
| 7,546,635 | B1 | 6/2009 | Krohn et al. |
| 7,596,807 | B2 | 9/2009 | Ptacek et al. |
| 7,646,771 | B2 | 1/2010 | Guru et al. |
| 7,725,587 | B1 | 5/2010 | Jacoby et al. |
| 7,725,934 | B2 | 5/2010 | Kumar et al. |
| 7,735,116 | B1 | 6/2010 | Gauvin |
| 7,810,151 | B1 | 10/2010 | Guruswamy |
| 7,860,999 | B1 | 12/2010 | Subramanian et al. |
| 7,937,353 | B2 | 5/2011 | Bernoth et al. |
| 7,966,659 | B1 | 6/2011 | Wilkinson et al. |
| 7,992,208 | B2 | 8/2011 | Khandani et al. |
| 7,996,670 | B1 | 8/2011 | Krishna et al. |
| 8,005,966 | B2 | 8/2011 | Pandya |
| 8,020,200 | B1 | 9/2011 | Krohn et al. |
| 8,339,959 | B1 | 12/2012 | Moisand et al. |
| 8,514,756 | B1 | 8/2013 | Ramachandra et al. |
| 8,635,326 | B1 | 1/2014 | Chaganti et al. |
| 8,650,279 | B2 | 2/2014 | Mehta et al. |
| 8,948,174 | B2 | 2/2015 | Szyszko et al. |
| 9,251,535 | B1* | 2/2016 | Krishna ............. G06Q 30/06 |
| 2002/0095492 | A1 | 7/2002 | Kaashoek et al. |
| 2002/0126621 | A1 | 9/2002 | Johnson et al. |
| 2002/0141343 | A1 | 10/2002 | Bays |
| 2003/0005145 | A1 | 1/2003 | Bullard |
| 2003/0014665 | A1 | 1/2003 | Anderson et al. |
| 2003/0097557 | A1 | 5/2003 | Tarquini et al. |
| 2003/0110274 | A1 | 6/2003 | Pazi et al. |
| 2003/0120769 | A1 | 6/2003 | McCollom et al. |
| 2003/0145104 | A1 | 7/2003 | Boden et al. |
| 2003/0210652 | A1 | 11/2003 | Chiang |
| 2003/0214913 | A1 | 11/2003 | Kan et al. |
| 2004/0001514 | A1 | 1/2004 | Wookey et al. |
| 2004/0013119 | A1 | 1/2004 | MeLampy et al. |
| 2004/0015721 | A1 | 1/2004 | Eastlake |
| 2004/0044912 | A1 | 3/2004 | Connary et al. |
| 2004/0078485 | A1 | 4/2004 | Narayanan |
| 2004/0093513 | A1 | 5/2004 | Cantrell et al. |
| 2004/0196843 | A1 | 10/2004 | Zinin |
| 2004/0205360 | A1 | 10/2004 | Norton et al. |
| 2004/0255202 | A1 | 12/2004 | Wong et al. |
| 2005/0044406 | A1 | 2/2005 | Stute |
| 2005/0066053 | A1 | 3/2005 | McDysan |
| 2005/0102414 | A1 | 5/2005 | Hares et al. |
| 2005/0108156 | A1 | 5/2005 | Sumino et al. |
| 2005/0111367 | A1 | 5/2005 | Chao et al. |
| 2005/0114536 | A1* | 5/2005 | Narad ............. H04L 45/60 709/231 |
| 2005/0114700 | A1 | 5/2005 | Barrie et al. |
| 2005/0160289 | A1 | 7/2005 | Shay |
| 2005/0210533 | A1 | 9/2005 | Copeland et al. |
| 2005/0226250 | A1 | 10/2005 | Makayama et al. |
| 2005/0283447 | A1* | 12/2005 | Xu ............. G06Q 30/0283 705/400 |
| 2005/0289219 | A1 | 12/2005 | Nazzal |
| 2006/0026669 | A1 | 2/2006 | Zakas |
| 2006/0089994 | A1 | 4/2006 | Hayes |
| 2006/0123481 | A1 | 6/2006 | Bhatnagar et al. |
| 2006/0146816 | A1 | 7/2006 | Jain |
| 2006/0156403 | A1 | 7/2006 | Haeffele et al. |
| 2006/0185008 | A1 | 8/2006 | Le et al. |
| 2006/0195896 | A1 | 8/2006 | Fulp et al. |
| 2006/0259970 | A1 | 11/2006 | Sheymov et al. |
| 2007/0027992 | A1 | 2/2007 | Judge et al. |
| 2007/0067438 | A1 | 3/2007 | Goranson et al. |
| 2007/0121596 | A1 | 5/2007 | Kurapati et al. |
| 2007/0180511 | A1 | 8/2007 | Eastlake |
| 2007/0192863 | A1 | 8/2007 | Kapoor et al. |
| 2007/0239987 | A1 | 10/2007 | Hoole et al. |
| 2007/0294369 | A1 | 12/2007 | Ginter et al. |
| 2008/0010225 | A1 | 1/2008 | Gonsalves et al. |
| 2008/0034425 | A1 | 2/2008 | Overcash et al. |
| 2008/0044181 | A1 | 2/2008 | Sindhu |
| 2008/0077694 | A1 | 3/2008 | Nordmark et al. |
| 2008/0127338 | A1 | 5/2008 | Cho et al. |
| 2008/0168135 | A1 | 7/2008 | Redlich et al. |
| 2008/0240128 | A1 | 10/2008 | Elrod |
| 2008/0298392 | A1 | 12/2008 | Sanchez et al. |
| 2009/0003349 | A1 | 1/2009 | Havemann et al. |
| 2009/0019538 | A1 | 1/2009 | Pandya |
| 2009/0126003 | A1 | 5/2009 | Touboul |
| 2009/0180449 | A1 | 7/2009 | Maki |
| 2009/0232150 | A1 | 9/2009 | Mistry |
| 2009/0288157 | A1 | 11/2009 | Pacella et al. |
| 2010/0070624 | A1* | 3/2010 | Lee ............. H04L 43/12 709/224 |
| 2010/0071024 | A1 | 3/2010 | Eyada |
| 2011/0197278 | A1 | 8/2011 | Chow et al. |

OTHER PUBLICATIONS

"About Endace," www.endace.com.
"Cisco IOS NetFlow," www.cisco.com/warp/public/732/Tech/nmp/netflow/index.shtml.
"Well-Known TCP Port Number," www.webopedia.com, 2004, 3 pages.
"TCP Packet Field Descriptions," www.ipanalyser.co.uk, Analyser Sales Ltd., Copyright 2003, 2 pages.
Egan, "Decomposition of a TCP Packet," www.passwall.com, 3 pages, Aug. 7, 2000.
Gibbs, "A Guide to Original SYN," www.nwfusion.com, Network World, Nov. 2000, 4 pages.
"Sample TCP/IP Packet," www.passwall.com, Version 0.0.0 @ 03:55/08.07.2000, Copyright 2002, 8 pages.
Bernstein, "SYN Cookies," http://cr.yp.to/syncookies.html, Oct. 2003, 3 pages.
Lemon, "Resisting SYN Flood DoS Attacks with a SYN Cache," http://people.freebsd.org/~jlemon/papers/syncache.pdf, 10 pages.
Staniford, et al., "Practical Automated Detection of Stealthy Portscans," http://downloads.securityfocus.com/library/spice-ccs2000.pdf, 16 pages.
Weaver et al., "A Real-Time Monitor for Token Ring Networks," Military Communications Conference, 1989. MILCOM '89, Oct. 1989, vol. 3, pp. 794-798.
Dini, P. et al., "Performance Evaluation for Distributed System Components," Proceedings of IEEE Second International Workshop on Systems Management, Jun. 1996, pp. 20-29.

(56) References Cited

OTHER PUBLICATIONS

Integrated Services Adapter, 2000, Cisco Systems, Data Sheet, pp. 1-6, http://www.cisco.com/warp/public/cc/pd/faa/svaa/iasvaa/prodlit/ism2_ds.pdf.

Juniper Networks, Inc., "Combating Bots and Mitigating DDos Attacks," Juniper Networks, Inc., 2008. http://www.juniper.net/solutions/literature/solutionbriefs/351198.pdf.

3GPP TS 23A01, V10.0.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), Jun. 2010, 261 pp.

3GPP TS 36.300, V10.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Jun. 2010, 183 pp.

Prosecution History from U.S. Pat. No. 9,251,535, dated Dec. 22, 2014, through Dec. 16, 2015, 52 pp.

\* cited by examiner

OFFLOAD OF DATA TRANSFER STATISTICS FROM A MOBILE ACCESS GATEWAY

The application is a continuation of U.S. application Ser. No. 13/344,325, filed Jan. 5, 2012, the entire contents of which are hereby incorporated herein by reference.

TECHNICAL FIELD

The invention relates to mobile networks and, more specifically, to handling subscriber traffic within mobile networks.

BACKGROUND

Many modern cellular devices can connect to packet-based networks over mobile access networks. For example, mobile telephones and other types of devices can connect to the Internet via a cellular radio access network. The service providers who operate such access networks may charge subscribers based on a variety of criteria, such as how much data the subscribers transfer over the access networks, the time of day the data is transferred, a service level for the subscriber and the like. For instance, a service provider may charge or bill a subscriber a given amount of money if the subscriber transfers more than a given amount of data over the access network in a billing period.

SUMMARY

In general, this disclosure describes techniques for collecting and outputting ("offloading") data transfer statistics from a mobile access gateway within an access network. The data transfer statistics accurately indicate a quantity of data transferred for individual subscriber sessions communicating through the mobile access gateway. In one example, the mobile access gateway comprises a distributed control plane having a plurality of subscriber management service units for authenticating and managing subscriber sessions and a distributed forwarding plane having a plurality of forwarding units for processing subscriber data traffic. Each of the forwarding units includes at least one packet forwarding engine (PFE), which may take the form of a special-purpose network processor, such as an application-specific integrated circuit (ASIC). When a PFE receives a packet associated with a subscriber session, the PFE updates a corresponding data transfer statistic stored in a high-speed internal memory within the PFE. The PFE updates the data transfer statistic based on a quantity of data in the packet so as to maintain an accurate (e.g., byte accurate) count of the amount of data transferred by the subscriber session.

As described, the PFEs of the forwarding units within the mobile access gateway may support thousands or millions of concurrent subscribers and yet maintain accurate data transfer statistics. Techniques are described herein by which each PFE pushes the data transfer statistic from internal memory to general purpose memory of the forwarding unit that contains the PFE and ultimately to the particular subscriber management service unit that is anchoring the subscriber session in the control plane. In turn, the subscriber management service units within the control plane aggregate the traffic statistics for export from the mobile access gateway to a billing system of the service provider. As described, the techniques allow the mobile access gateway to maintain highly accurate traffic statistics for thousands or millions of subscribers within a mobile access network.

In one aspect, this disclosure describes a method for offloading a data transfer statistic from a PFE of a forwarding unit in a mobile access gateway. The method comprises receiving, at the forwarding unit of the mobile access gateway, a packet associated with a subscriber session. The method also comprises updating, by the PFE, the data transfer statistic based on a quantity of data in the packet, the data transfer statistic stored in a memory within the PFE. The method also comprises pushing, by the PFE, the data transfer statistic from the memory of the PFE to a memory of the forwarding unit.

In another aspect, this disclosure describes a mobile access gateway comprising a forwarding unit that comprises a forwarding unit memory and a PFE. The PFE comprises a PFE memory that stores a data transfer statistic. The PFE is configured to receive a packet associated with a subscriber session, update the data transfer statistic based on a quantity of data in the packet, and push the data transfer statistic from the PFE memory to the forwarding unit memory.

In another aspect, this disclosure describes a non-transitory computer-readable medium comprising instructions for causing one or more programmable processors to copy a data transfer statistic from a memory of a forwarding unit of a mobile access gateway to a FIFO associated with a service unit of the mobile access gateway, the data transfer statistic based on a quantity of data transferred in a subscriber session, the data transfer statistic being updated by a PFE of the forwarding unit and pushed by the forwarding unit into the memory of the forwarding unit.

The details of one or more examples are set forth in the accompanying drawings and the description below. Other features, objects, and advantages of the examples will be apparent from the description, drawings, and claims.

DETAILED DESCRIPTION

The attached drawings illustrate examples. Elements indicated by reference numbers in the attached drawings correspond to elements indicated by like reference numbers in the following description. In the attached drawings, ellipses indicate the presence of one or more elements similar to those separated by the ellipses. Furthermore, stacked elements in the attached drawings indicate the presence of one or more similar elements. Alphabetical suffixes on reference numbers for similar elements are not intended to indicate the presence of particular numbers of the elements. In this disclosure, elements having names that start with ordinal words (e.g., "first," "second," "third," and so on) do not necessarily imply that the elements have a particular order. Rather, such ordinal words are merely used to refer to different elements of a same or similar type.

Figure 1:
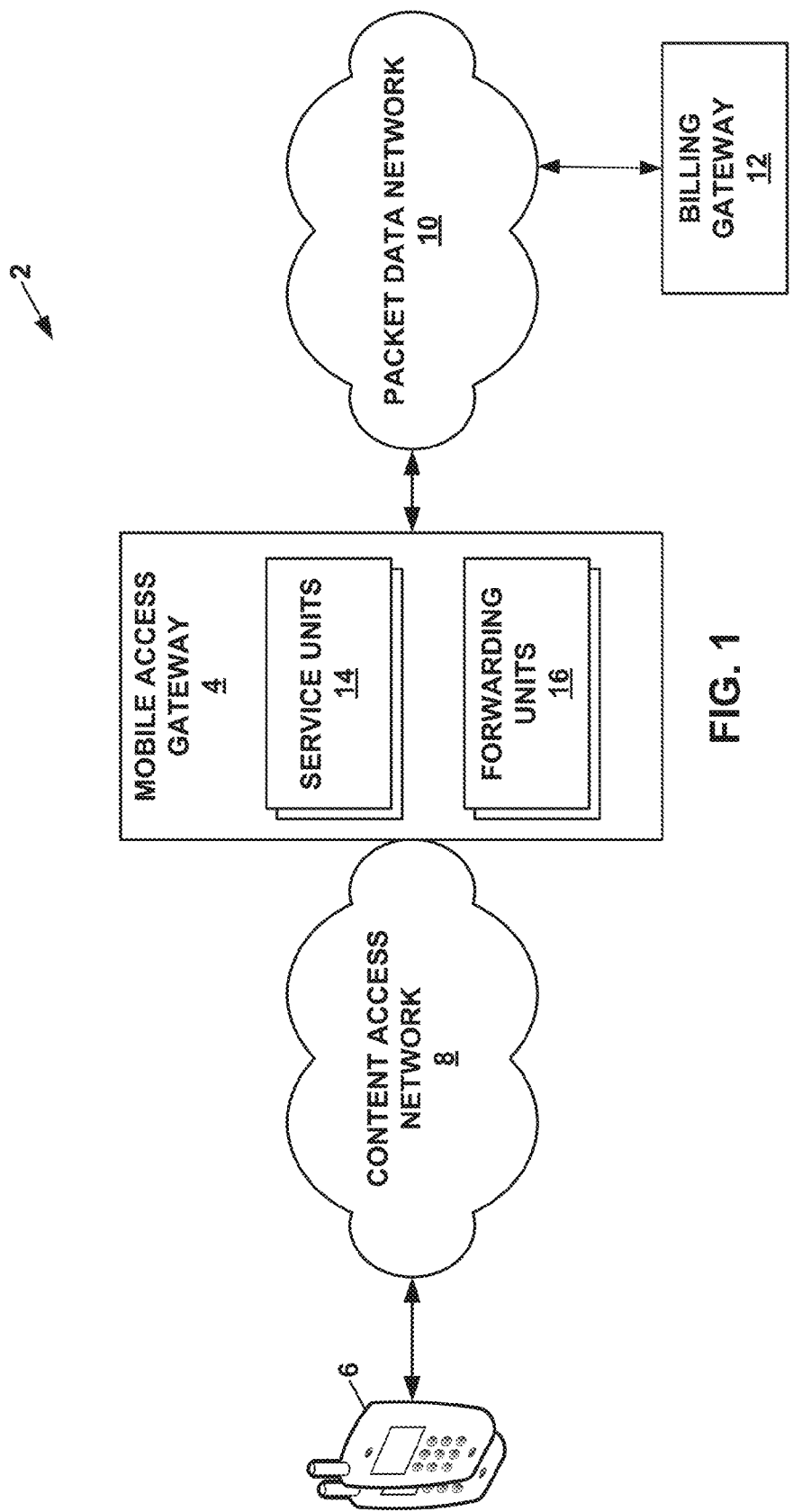
FIG. 1 is a block diagram that illustrates an example network system in which a mobile access gateway uses a push model to offload data transfer statistics.

FIG. 1 is a block diagram that illustrates an example network system 2 in which a mobile access gateway 4 uses a push model to offload data transfer statistics. In the example of FIG. 1, network system 2 includes mobile access gateway 4, one or more wireless devices 6, a content access network 8, a packet data network 10, and a billing gateway 12.

Packet data network 10 may provide one or more packet-based services for request and use by wireless devices 6. Example types of packet-based services provided by packet data network 10 may include, but are not limited to, bulk data delivery, voice over Internet protocol (VoIP), Internet Protocol television (IPTV), Short Messaging Service (SMS), Wireless Application Protocol (WAP) service, or customer-specific application services. In various examples, packet data network 10 may comprise various types of networks. For instance, packet data network 10 may comprise a local area network (LAN), a wide area network (WAN), the Internet, a virtual LAN (VLAN), an enterprise LAN, a layer 3 virtual private network (VPN), an Internet Protocol (IP) intranet operated by a service provider that operates content access network 8, an enterprise IP network, or some combination thereof. In various examples, packet data network 10 is connected to a public WAN, the Internet, or to other networks. One or more packet data protocols (PDPs) may operate over packet data network 10 to enable packet-based delivery of services. Example PDPs may include, but are not limited to, IP (IPv4 and/or IPv6), X.25, and Point-to-Point Protocol (PPP).

Although the example of FIG. 1 shows wireless devices 6 as mobile telephones, wireless devices 6 may comprise various other types of wireless communication devices. For example, wireless devices 6 may comprise laptop or desktop computers, netbooks, video game devices, pagers, smart phones, personal data assistants (PDAs), utility meters, security devices such as a motion detectors or door locks, wireless sensors, tablet computers, appliances, in-car computers, or other types of wireless communication devices. In various instances, wireless devices 6 may also be referred to as User Equipment (UE) or Mobile Stations (MS). Wireless devices 6 may run one or more applications, such as VoIP clients, video games, videoconferencing applications, e-mail applications, web browser applications, and/or other types of applications. Certain applications running on wireless devices 6 may access services provided via packet data network 10.

Each of wireless devices 6 is associated with a subscriber. In some instances, multiple wireless devices are associated with a single subscriber. A subscriber may be a person, a business organization, a governmental organization, a non-governmental organization, or another entity that subscribes to a service that enables wireless devices 6 to exchange data with one or more of the services provided via packet data network 10. For example, a service provider may operate content access network 8 to provide network access, data transport, and other services to wireless devices 6. In this example, the subscribers may subscribe to the services provided by the service provider.

Figure 2:
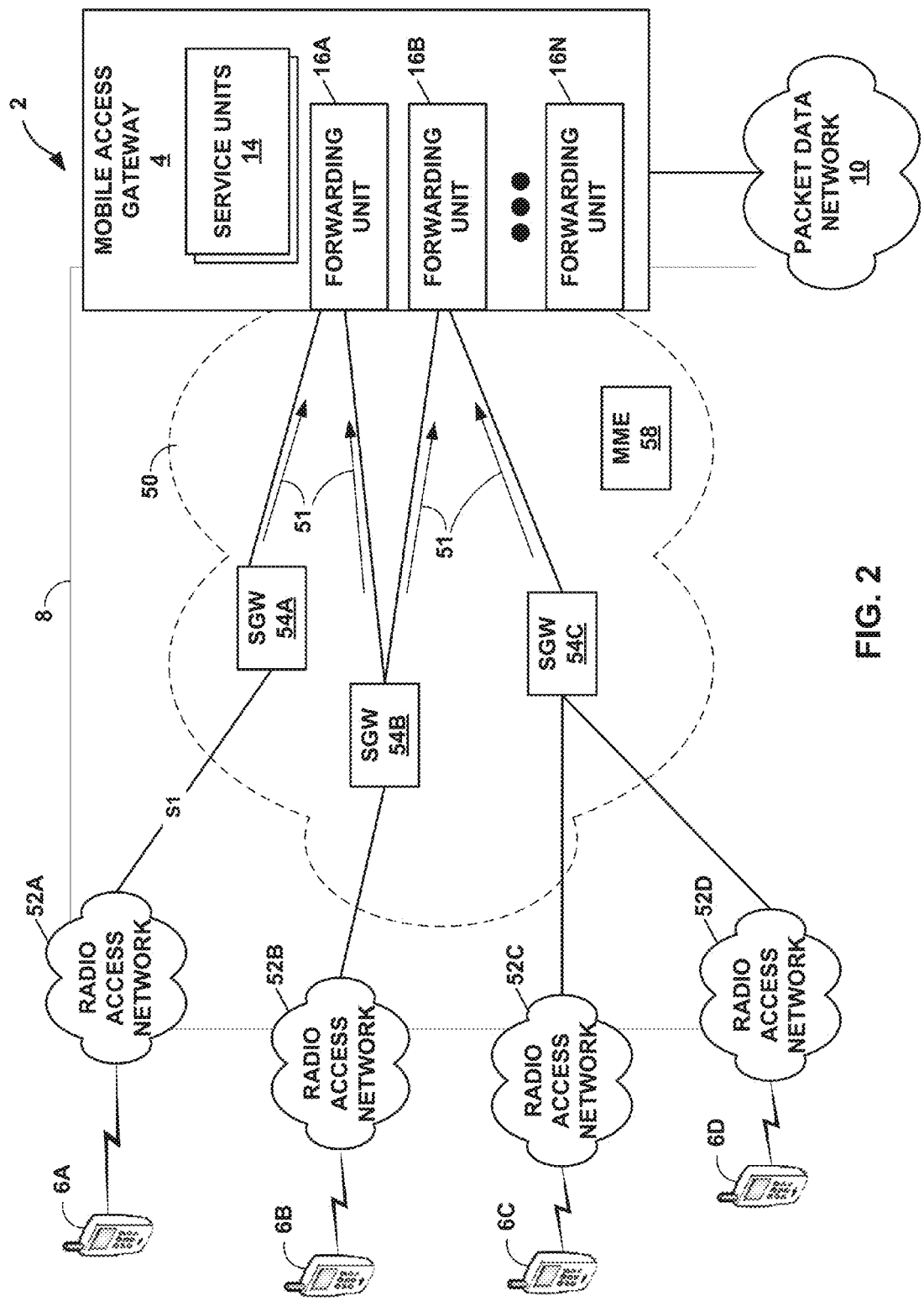
FIG. 2 is a block diagram that illustrates an example configuration of a content access network.

Content access network 8 delivers user traffic from wireless devices 6 to mobile access gateway 4 and delivers user traffic from mobile access gateway 4 to wireless devices 6. In various examples, content access network 8 is implemented in various ways. For example, content access network 8 may implement a cellular network architecture such as those defined by the Global System for Mobility (GSM) Association, the 3$^{rd}$ Generation Partnership Project (3GPP), the Internet Engineering Task Force (IETF), the Worldwide Interoperability for Microwave Access (WiMAX) Forum, and other standards bodies. Example network architectures defined by the 3GPP include the General Packet Radio Service (GPRS) architecture, the Universal Mobile Telecommunications System (UMTS) architecture, the Enhanced Data Rates for GSM Evolution (EDGE) architecture, the Long Term Evolution (LTE) architecture, and the LTE Advanced architecture. Alternatively or in conjunction with one of the above, content access network 8 may implement a Code Division Multiple Access-2000 ("CDMA2000") architecture. The WiMAX architecture is a cellular network architecture defined by the WiMAX Forum. FIG. 2, described below, illustrates example details of content access network 8.

Content access network 8 establishes and operates bearers to transport user traffic, in the form of PDP packet data units (PDUs), referred to hereinafter as "packets." In general, a bearer is a set of network resources and data transport functions in content access network 8 that deliver user traffic between two network entities. A bearer may include a path, a logical connection, or a physical or wireless connection between two network devices. For example, a bearer may comprise an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and "3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

In the example of FIG. 1, mobile access gateway 4 comprises a network device that operates as a gateway to packet data network 10. For example, mobile access gateway 4 may comprise a Gateway GPRS Serving Node (GGSN), an Access Gateway (aGW), a packet data network (PDN) Gateway (PGW), or another type of network device that may operate as a gateway between content access network 8 and packet data network 10. In some examples, mobile access gateway 4 is a router that executes routing protocols to identify routes through content access network 8 or packet data network 10 to various destinations.

In the example of FIG. 1, mobile access gateway 4 comprises a distributed control plane having a plurality of subscriber management service units ("service units") 14 for authenticating and managing subscriber sessions and a distributed forwarding plane having a plurality of forwarding units 16 for processing subscriber data traffic. Each of forwarding units 16 may comprise one or more removable physical interface cards (PICs). Each of the PICs may connect mobile access gateway 4 to a different communication link in content access network 8 or packet data network 10. In addition, each of forwarding units 16 comprises a general purpose microprocessor and supporting computing hardware including memory, and one or more packet forwarding engines (PFEs), which may take the form of a special-purpose network processor having customized internal logic for processing network packets. In one example, each of forwarding units 16 may comprise four PFEs. Each of the PFEs may be implemented as one or more application-specific integrated circuits (ASICs) having high-speed internal memory. In some examples, each of forwarding units 16 is insertable within a chassis of mobile access gateway 4.

As mentioned above, mobile access gateway 4 functions as a gateway between content access network 8 and packet data network 10. Thus, when wireless devices 6 send packets to the services available via packet data network 10, content access network 8 delivers the packets to mobile access gateway 4 and mobile access gateway 4 may forward the packets on packet data network 10 for delivery to the services. Likewise, when the services available via packet data network 10 send packets to wireless devices 6, packet data network 10 delivers the packets to mobile access gateway 4 and mobile access gateway 4 may forward the packets on content access network 8 for delivery to wireless devices 6.

The packets received by mobile access gateway 4 are associated with subscriber sessions. Each subscriber session is a logical, authenticated connection for exchanging of data between an individual wireless device and a service provided via packet data network 10. Because each of wireless devices 6 is associated with a subscriber, each of the subscriber sessions is associated with a subscriber.

To establish subscriber sessions, wireless devices 6 send session requests on content access network 8. Forwarding units 16 of mobile access gateway 4 receive session requests and forward the session requests to service units 14 of mobile access gateway 4. In some instances, service units 14 may be referred to herein as "service PICs" or "subscriber management service units." When a service unit receives a session request to establish a subscriber session between a given wireless device and a given service, the service unit generates session context information for the subscriber session. The session context information for the subscriber session may indicate a PDP address of the given wireless device and an Access Point Name (APN) for the given service, forwarding information, charging information, and one or more quality of service (QoS) profiles for the subscriber associated with the subscriber session. After generating the session context information for a subscriber session, the service unit may configure forwarding units 16 to process and forward packets belonging to the subscriber session. Furthermore, the service unit may select one of forwarding units 16 to "anchor" the subscriber session.

After a wireless device establishes a subscriber session with a service, a forwarding unit of mobile access gateway 4 may receive a packet associated with the subscriber session. When a forwarding unit receives a packet that belongs to the subscriber session, a PFE of the forwarding unit performs a datapath operation on the packet. The PFE may perform various datapath operations on the packet depending on whether the forwarding unit anchors the subscriber session and depending on values in the session context information for the subscriber session. For example, if the forwarding unit does not anchor the subscriber session, the forwarding unit may perform a datapath operation that forwards the packet to the forwarding unit of mobile access gateway 4 that anchors the subscriber session. If the forwarding unit anchors the subscriber session, the PFE of the forwarding unit may perform a datapath operation that identifies and performs packet processing operations with regard to the packet. The PFE may identify the packet processing operations to perform with regard to the packet based on the session context information for the subscriber session.

The packet processing operations may include various operations. For example, one packet processing operation may involve identifying a next hop for the packet and forwarding the packet to the identified next hop. The next hop for the packet may be another one of forwarding units, one of service units 14, or an output interface of the forwarding unit.

Furthermore, the packet processing operations performed by the PFE may include updating one or more data transfer statistics stored in a memory of the PFE based on a quantity of data stored in the packet. In some examples, the data transfer statistic may indicate a quantity of data exchanged by the subscriber during the subscriber session so as to maintain an accurate (e.g., byte accurate) count of the amount of data transferred by the subscriber session. In such examples, the PFE may update the data transfer statistic by adding the quantity of data in the packet to the data transfer statistic. In this way, the PFEs of forwarding units 16 within mobile access gateway 4 may support thousands or millions of concurrent subscribers and yet maintain accurate data transfer statistics on a per-subscriber basis.

In accordance with the techniques of this disclosure, a rate-controlled offload process is described in which the PFE pushes the data transfer statistic from the internal memory of the PFE to the general-purpose memory of the forwarding unit 16 in which the PFE is located. For instance, internal logic within the PFE may copy the data transfer statistic from the internal memory of the PFE to the external memory of the forwarding unit without first receiving a request from the general-purpose microprocessor of the forwarding unit. In other words, the PFE does not necessarily send a copy of the data transfer statistic to the memory of the forwarding unit in response to a request from the microprocessor of the forwarding unit. Moreover, the PFE may asynchronously push accurate statistics for the current subscriber sessions in a rate-controlled manner at appropriate times based on per-subscriber context information programmed within an internal packet-processing forwarding path of the PFE.

Software programs executing on the general-purpose microprocessor of the forwarding unit may operate to monitor the statistics pushed by the internal logic of the PFE to identify the service units 14 to which each individual subscriber session is anchored in the control plane. The software programs executing on the forwarding units 16 may then copy each data transfer statistic to a respective first-in-first-out data structure (FIFO) associated with the identified service units 14 for delivery to the service units. In response to receiving data transfer statistics, each of service units 14 updates session records for the individual subscribers for delivery to billing gateway 12. The service units 14 may process the session records associated with the subscriber sessions in various ways. For example, the service units 14 may generate aggregate data for each subscriber based on the data transfer statistics received from forwarding units 16 and send the resulting aggregate data to billing gateway 12. For instance, the service unit may aggregate the data transfer statistics for subscriber sessions associated with the same subscriber. In this example, the service unit may forward the aggregated data transfer statistics to billing gateway 12 via packet data network 10.

Billing gateway 12 may use the data provided by mobile access gateway 4 to generate charges or bills to subscribers based on data transfer statistics. For example, if the data provided by mobile access gateway 4 indicates a quantity of data exchanged over content access network 8 by a subscriber, billing gateway 12 may generate charges or bills to the subscriber based on the quantity of data exchanged by the subscriber during a billing period.

Thus, mobile access gateway 4 may perform a method for offloading data transfer statistics from the distributed PFEs of forwarding units 16 in mobile access gateway 4 to distributed service units 14 that manage control plane functions for the individual subscribers. The method comprises receiving, at the forwarding unit of mobile access gateway 4, a packet associated with a subscriber session. The method may also comprise updating, by the PFE, the data transfer statistic based on a quantity of data in the packet, the data transfer statistic stored in a memory of the PFE. In addition, the method may also comprise pushing the data transfer statistic from the memory of the PFE to a memory of the forwarding unit. Furthermore, mobile access gateway 4 may comprise a forwarding unit that comprises a forwarding unit memory and a PFE that comprises a PFE memory that stores a data transfer statistic. The PFE is configured to receive a packet associated with a subscriber session, update the data transfer statistic based on a quantity of data in the packet, and push the data transfer statistic from the PFE memory to the forwarding unit memory.

FIG. 2 is a block diagram that illustrates an example configuration of content access network 8. In the example of FIG. 2, content access network 8 includes a core network 50 and a plurality of radio access networks 52A through 52N (collectively, "radio access networks 52"). Core network 50 transmits packets from radio access networks 52 to mobile access gateway 4 and from mobile access gateway 4 to radio access networks 52. Core network 50 may comprise various types of networks, such as a GPRS core packet-switched network, an IP-based mobile multimedia core network, an Evolved Packet Core (EPC), or an Evolved Packet System (EPS).

Core network 50 comprises intermediate devices that implement the protocols of content access network 8. Example type of intermediate devices in the core network 50 may include, but are not limited to, Serving GPRS Support Nodes (SGSNs) and Mobility Management Entities (MMEs). In the example of FIG. 1, core network 50 includes mobile access gateway 4, a plurality of Serving Gateways (SGWs) 54A-54N (collectively, "Serving Gateways 54" or "SGWs 54"), and a MME 58

MME 58 is logically connected to SGWs 54. In some examples, MME 58 may, in addition to bearer management and establishment, host Non-Access Stratum (NAS) signaling, mobile access gateway 4 and SGW 54 selection, roaming, and authentication. In various examples, core network 50 includes different numbers of MMEs, SGWs, and/or PGWs. In different architectural examples of content access network 8, such as a UTRAN network, SGSNs may perform the functionality of SGWs 54 and MME 58, and a GGSN may perform functionality of mobile access gateway 4 consistent with the techniques of this disclosure. While described with respect to a particular type of LTE node, i.e., a PGW, the techniques may be applicable to other types of core network gateways, including GGSNs, SGSNs, aGWs, and SGWs.

Each of radio access networks 52 may be a radio access network, which in various instances may be a GSM Radio Access Network (GRAN), a WiMAX radio access network, a UTRAN, and/or an evolution of a UTRAN for LTE networks known as an E-UTRAN. Each of radio access networks 52 may include one or more radio towers, which in the case of E-UTRANs are eNode Bs and in the case of UMTS radio access networks are Node Bs. In some examples, wireless devices 6 communicatively couple to radio access networks 52 using Uu interfaces operating over radio links.

Content access network 8 may further include a backhaul or transport network (not shown) that includes land-based transmission lines, frequently leased by a service provider, to transport user and control traffic between wireless devices 6 and mobile access gateway 4. The backhaul network may also include network devices such as aggregation devices and routers. Further details of an example content access network for a mobile network are described in U.S. patent application Ser. No. 12/905,771, entitled "COLLECTIVELY ADDRESSING WIRELESS DEVICES," filed Oct. 15, 2010, the entire contents being incorporated herein by reference.

Mobile access gateway 4 may present a uniform interface to downstream nodes, such as SGSNs and MMEs, to allow the downstream nodes to send session requests to the uniform interface rather than distributing session requests among multiple devices or multiple control plane entities (e.g., service cards) within a single device. In some instances, the uniform interface is associated with an IP address or other network layer address of mobile access gateway 4 that is shared among control plane entities. In general, service units 14 of mobile access gateway 4 respond to session requests 51 from SGWs 54. Each session request 51 may include a wireless device identifier (e.g., an IMSI) for the wireless device 6 that initiated the request. The session requests 51 may further include an APN that identifies a packet data network and may in some instances further identify a requested service (e.g., Internet, WAP, or multimedia messaging service (MMS)) provided by the packet data network. In other words, the APN is a logical name that determines the appropriate gateway (e.g., GGSN) for the wireless device and by a gateway to determine the services requested by the user or the address of an access point in an external packet network to which user packets from the wireless device should be forwarded. Service units 14 provide control plane functions such as an authentication, authorization, and accounting (AAA) protocol, a dynamic host configuration protocol (DHCP), and a charging protocol for communication, for example, with a policy charging rules function (PCRF) entity to obtain charging characteristics and requirements on a per-charging basis. For each subscriber sessions, PFEs within forwarding units 16 maintain and push data transfer statistic from internal memory to general purpose memory of the forwarding unit that contains the PFE and ultimately to the particular service unit 14 that is anchoring the subscriber session in the control plane. In turn, subscriber management service units 14 aggregate the traffic statistics for export from mobile access gateway 4 to a billing system (e.g., billing gateway 12) of the service provider.

Figure 3:
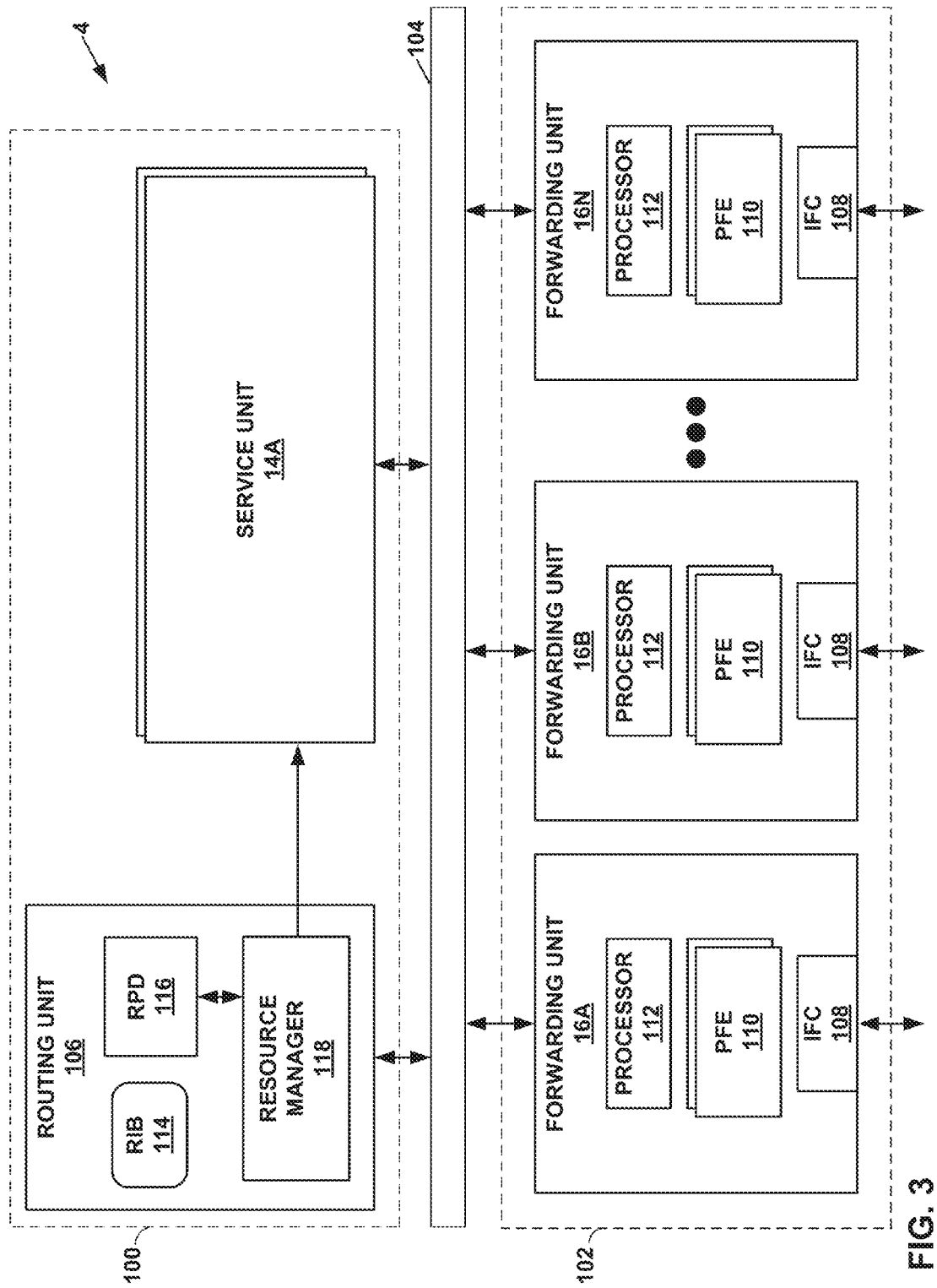
FIG. 3 is a block diagram that illustrates an example configuration of the mobile access gateway.

FIG. 3 is a block diagram that illustrates an example configuration of mobile access gateway 4. In the example of FIG. 3, mobile access gateway 4 comprises a control plane 100 and a forwarding plane 102 connected by internal, high-speed switch fabric (switch 104). In some instances, this disclosure may refer to forwarding plane 102 as a "data plane."

Control plane 100 provides routing/control functionalities. Forwarding plane 102 provides forwarding/data functionalities. In various examples, control plane 100 and forwarding plane 102 may be implemented in various ways. For example, control plane 100 and/or forwarding plane 102 may be implemented as separate physical dedicated hardware components that either statically implement the functionality in hardware or dynamically execute software to implement the functionality.

Control plane 100 comprises a routing unit 106 and service units 14. Control plane 100 is a decentralized control plane in that the functionality of control plane 100 is distributed among routing unit 106 and service units 14. Forwarding plane 102 comprises forwarding units 16. Forwarding plane 102 is a distributed forwarding plane in that data plane functionality and packet forwarding functionality is distributed among forwarding units 16. In some examples, packet forwarding functionality may be consolidated in a single forwarding unit.

In various examples, routing unit 106, subscriber management service units 14, and forwarding units 16 may be implemented in various ways. For example, routing unit 106, service units 14, and forwarding units 16 may each include one or more processors and one or more computer-readable storage media that store software instructions that define software programs. In this example, execution of the software instructions by the processors may cause routing unit 106, service units 14, and forwarding units 16 to provide some or all of the functionality ascribed in this disclosure to routing unit 106, service units 14, and forwarding units 16. Example types of non-transitory computer-readable storage media include, but are not limited to, storage devices (e.g., disk drives or optical drives) or memory (such as Flash memory, random access memory or RAM) or other types of volatile or non-volatile memory that store data and instructions. Furthermore, in some examples, routing unit 106, service units 14, and forwarding units 16 may include dedicated hardware, such as one or more integrated circuits, one or more ASICs, one or more Application Specific Special Processors (ASSPs), one or more Field Programmable Gate Arrays (FPGAs), or any combination of one or more of the foregoing examples of dedicated hardware.

Switch 104 delivers data units and control messages among routing unit 106, service units 14, and forwarding units 16. In various examples, switch 104 is implemented in various ways. For instance, switch 104 may comprise an internal switch fabric, an internal cross-bar, a bus, or a link. Examples of high-speed multi-stage switch fabrics used as a data plane to relay packets between units within a router are described in U.S. Patent Application 2008/0044181, entitled "MULTI-CHASSIS ROUTER WITH MULTIPLEXED OPTICAL INTERCONNECTS," the entire contents of which are incorporated herein by reference.

As illustrated in the example of FIG. 3, each of forwarding units 16A-16N comprises one or more interface cards ("IFCs") 108, one or more packet forwarding engines ("PFEs") 110, and one or more processors 112. In some examples, each of forwarding units 16 connects to one or more instances of various LTE interfaces. Each of IFCs 108 includes one or more outbound interfaces that couple to physical communication links to external devices that are capable of carrying subscriber control and data traffic.

PFEs 110 may each represent a dense port concentrator (DPC), a modular port concentrator (MPC), a flexible PIC concentrator (FPC), or another line card that is insertable within a chassis of mobile access gateway 4. For instance, IFCs 108 may include multiple PICs that each include one or more inbound/outbound interfaces. Each of forwarding units 16 may include substantially similar components to perform substantially similar functionality.

Each of forwarding units 16 may include a unique identifier that identifies the forwarding unit to other components of mobile access gateway 4. For example, identifiers of forwarding units 16 may include an index, a slot, an identifying string, an internal IP address, an interface identifier such as an outbound interface identifier, or a link layer address. In some examples, inbound and outbound interfaces (e.g., ports) of IFCs 108 may be specified by identifying the port type, a slot in a chassis of mobile access gateway 4 for the corresponding one of forwarding units 16, a PIC, and a port number. For example, GigE-3/1/2 identifies port 2 of PIC 1 on the one of forwarding units 16 that occupies slot 3 in the chassis of mobile access gateway 4, and the port is a Gigabit Ethernet port.

Forwarding units 16 receive via IFCs 108 data session traffic associated with a subscriber session. If necessary, forwarding units 16 internally forward the data session traffic to one of forwarding units 16 that anchors the subscriber session. Forwarding units 16 may also receive via IFCs 108 control session traffic associated with a subscriber session. If necessary, forwarding units 16 internally forward the control session traffic to one of service units 14 that anchors the subscriber session. Further details regarding internal packet forwarding are found in U.S. patent application Ser. No. 13/248,834, filed Sep. 9, 2011 and entitled "MOBILE ACCESS GATEWAY HAVING REDUCED FORWARDING STATE FOR ANCHORING MOBILE SUBSCRIBERS," the entire contents being incorporated by reference herein.

Routing unit 106 of control plane 100 executes the routing functionality of mobile access gateway 4. As illustrated in the example of FIG. 3, routing unit 106 comprises a routing information base ("RIB") 114, a routing protocol daemon ("RPD") 116, and a resource manager 118. RIB 114 stores routing information. For instance, RIB 114 may store information that defines a topology of a network, such as content access network 8 and/or packet data network 10 of FIG. 1. Routing protocol daemon 116 uses routing protocols by which mobile access gateway 4 exchanges the routing information stored in RIB 114 with other routers. Furthermore, routing protocol daemon 116 may resolve the topology defined by routing information in RIB 114 to select or determine one or more routes through content access network 8 and/or packet data network 10. For each selected route, routing protocol daemon 116 adds an entry to a route table that specifies, for the selected route, one or more outbound interfaces of various IFCs 108. In various examples, the route table is implemented in various ways. For example, the route table may be implemented as a radix tree having nodes that each key to a network address prefix and specify an outbound interface for the network address prefix. In this example, the network address prefixes may be IPv4IPv6 network address prefixes.

Routing protocol daemon 116 may update forwarding plane 102 with forwarding information directly or via resource manager 118. Further details of one example embodiment of a router can be found in U.S. patent application Ser. No. 12/182,619, filed Jul. 30, 2008 and entitled "STREAMLINED PACKET FORWARDING USING DYNAMIC FILTERS FOR ROUTING AND SECURITY IN A SHARED FORWARDING PLANE," which is incorporated herein by reference. Resource manager 118 of routing unit 106 allocates and manages resources of mobile access gateway 4 among service units 14 and forwarding units 16. In addition, resource manager 118 may mediate communication among service units 14 and other components of control plane 100.

Each of service units 14 presents a uniform interface to downstream devices and provides decentralized subscriber session setup and management for mobile access gateway 4.

For example, service units 14 may be addressable by the same PDP address. In this example, control messages destined for the PDP address of service units 14 may therefore be handled by any of service units 14. Each of service units 14 may be associated with a unique identifier that identifies the service unit to other components of mobile access gateway 4. For example, the identifiers of service units 14 may include indexes, slots, identifying strings, internal IP addresses, link layer addresses or other unique identifiers that uniquely identify service units 14 to other components of mobile access gateway 4.

In some examples, each of service units 14 comprises a packet forwarding engine (PFE) or other component of a physical interface card insertable within one or more chassis of mobile access gateway 4. The physical interface card may be, for instance, a multi-services dense port concentrator (MS-DPC). One or more of service units 14 may also each comprise a co-processor executing on a routing node, such as routing unit 106. Each of service units 14 may include substantially similar components to perform substantially similar functionality. Additional details regarding handling subscriber sessions with a decentralized control plane of multiple subscriber management service units may be found in U.S. patent application Ser. No. 13/172,556, entitled "MOBILE ACCESS GATEWAY HAVING DECENTRALIZED CONTROL PLANE FOR ANCHORING SUBSCRIBER SESSIONS," filed Jun. 29, 2011, the entire contents being incorporated herein.

Service units 14 may independently use control plane protocols to establish and manage subscriber sessions requested by subscribers. In this sense, service units 14 provide a form of a decentralized control plane for managing subscriber sessions. As a result, mobile access gateway 4 may achieve scalability to handle thousands or millions of concurrent subscriber sessions.

When one of service units 14 establishes a new subscriber session, the service unit generates session context information for the subscriber session. The session context information indicates packet processing operations to be performed on subscriber traffic associated with the subscriber session. Example types of packet processing operations include, but are not limited to packet filtering, lawful interception, IP address allocation (performed during subscriber session establishment), accounting, rate enforcement and traffic shaping, bearer binding to identify bearers to route and forward service packets, packet encapsulation/decapsulation for GTP-U traffic exchanged within bearers, route lookup of packets' outer IP addresses, packet forwarding, and/or other packet gateway functionality with respect to the subscriber session.

Furthermore, the session context information may include the PDP address of a wireless device associated with the subscriber session, forwarding information, an APN, charging information, and one or more QoS profiles for the subscriber associated with the subscriber session. The forwarding information may include tunnel endpoint identifiers (TEIDs) and identifiers/addresses for downstream service nodes.

When one of service units 14 establishes a session, the service unit selects one of forwarding units 16 to anchor the subscriber session. The service unit may select the forwarding unit to anchor the subscriber session based on a number of factors. For example, the service unit may select the forwarding unit to anchor the subscriber session based on an existing subscriber session load on the forwarding unit. In another example, the service unit may interact with a routing process of routing unit 106 to select the forwarding unit to anchor the subscriber session. In another example, a first one of forwarding units 16 may have a downstream interface for the subscriber session and a second one of forwarding units 16 may have an upstream interface for the subscriber session. In this example, the service unit may select the first forwarding unit when the first forwarding unit has more upstream interfaces than downstream interfaces. In this example, the service unit may select the second forwarding unit when the second forwarding unit has more downstream interfaces than upstream interfaces. By considering the relative number of downstream interfaces versus upstream interfaces, the service unit may be able to balance subscriber session traffic processing among forwarding units 16. In some examples, the service unit may select different ones of forwarding units 16 to anchor upstream and downstream traffic in the subscriber session.

When one of service units 14 selects a given forwarding unit to anchor a subscriber session, the service unit installs session context information on the given forwarding unit. Subsequently, the given forwarding unit may identify and process subscriber traffic for the subscriber session unit based on the session context information. As the service unit establishes the subscriber sessions, the service unit handles configuration of forwarding units 16 for constructing session-specific forwarding paths for processing and forwarding subscriber data traffic associated with the subscriber sessions. PFEs 110 of forwarding units 16 use session context information to perform datapath operations regarding packets that belong to subscriber sessions anchored by forwarding units 16. The datapath operations performed by a PFE include one or more packet processing operations. Example details on internal forwarding paths of forwarding units 16 can be found in U.S. patent application Ser. No. 13/172,505, entitled "VARIABLE-BASED FORWARDING PATH CONSTRUCTION FOR PACKET PROCESSING WITHIN A NETWORK DEVICE," filed Jun. 29, 2011, the entire contents being incorporated herein by reference.

Figure 4:
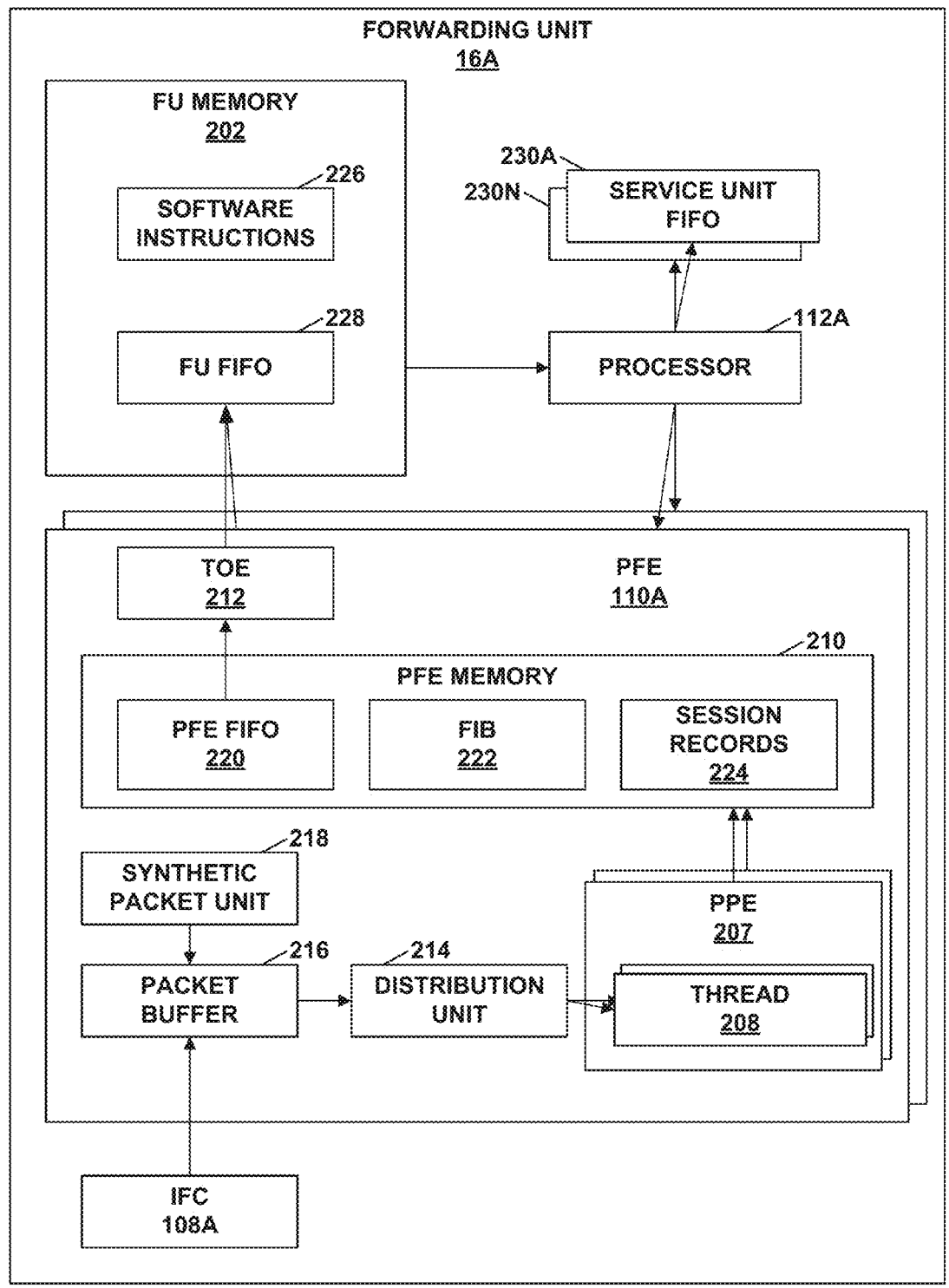
FIG. 4 is a block diagram that illustrates an example configuration of a forwarding unit.

FIG. 4 is a block diagram that illustrates an example configuration of forwarding unit 16A. Although FIG. 4 illustrates an example configuration of forwarding unit 16A, each of forwarding units 16 may have a similar configuration. As illustrated in the example of FIG. 4, forwarding unit 16A comprises a plurality of PFEs 110, a forwarding unit (FU) memory 202, a processor 112A, and a plurality of service unit FIFOs 230. In various examples, forwarding unit 16A may comprise various numbers of PFEs. For example, forwarding unit 16A may comprise four PFEs 110. In other examples, forwarding unit 16A may comprise more or fewer than four PFEs. Although FIG. 4 shows service unit FIFOs 230 as being outside of FU memory 202, in some examples, FU memory 202 stores service unit FIFOs 230.

Furthermore, as illustrated in the example of FIG. 4, PFE 110A may be a specialized packet processor having a multi-core architecture that includes an internal PFE memory 210 and hardware logic implementing a plurality of packet processing engines (PPEs) 207, a traffic offload engine (TOE) 212, a distribution unit 214, a packet buffer 216, and a synthetic packet unit 218. Each of PPEs 207 may provide a plurality of threads 208. Although not illustrated in the example of FIG. 4 for the sake of clarity, each of PFEs 110 may include corresponding threads, memories, TOEs, packet buffers, and synthetic packet units. In some examples, PFEs 110 may comprise more, fewer, or different components than those shown in the example of FIG. 4. For instance, in some examples PFEs 110 do not include synthetic packet units. In such examples, a single synthetic packet unit in forwarding unit 16A or elsewhere may provide the functionality of synthetic packet unit 218.

In the example of FIG. 4, internal PFE memory 210 stores a PFE FIFO 220, a forwarding information base (FIB) 222, and session records 224. In some examples, PFE memory 210 may store data in addition to PFE FIFO 220, FIB 222, and session records 224. In various examples, PFE memory 210 is implemented in various ways. For example, PFE memory 210 may a plurality of different memory units. In this example, different memory units of PFE memory 210 may store PFE FIFO 220, FIB 222, and session records 224. In other examples, a single memory unit of PFE memory 210 may store one or more of PFE FIFO 220, FIB 222, and session records 224.

Session records 224 are programmed within PFE 110A via processor 112A and contain data regarding subscriber sessions. For example, each of session records 224 may store a PDP address of a wireless device, forwarding information, an APN for a service provided via packet data network 10, and other data regarding subscriber sessions. In addition, each of session records 224 stores charging information regarding a subscriber session. The charging information contains data related to charging subscribers for exchanging data over content access network 8. For instance, the charging information in records includes data transfer statistics regarding the data exchanged by the subscribers during subscriber sessions.

In some examples, each of session records 224 includes a plurality of variable pairs. Each of the variable pairs specifies an identifier of a variable and a value for the variable. Each of the variables specifies a different piece of data regarding a subscriber session. For example, each of session records 224 may include a variable pair that includes an identifier of a data transfer statistic and a value that indicates a quantity of subscriber traffic transferred during the subscriber session associated with the session record.

Each of PPEs 207 may comprise hardware configured to execute threads 208. For instance, PPEs 207 may comprise specialized or general purpose integrated circuits for executing threads 208. In various examples, PFE 110A may comprise various numbers of PPEs 207. For example, PFE 110A may comprise sixteen PPEs. In various examples, PPEs 207 may comprise various numbers of threads 208. For example, each of PPEs 207 may comprise twenty threads. Thus, in this example, if PFE 110A comprises sixteen PPEs, forwarding unit 16A comprises 320 threads. In other examples, each of PPEs 207 may comprise more or fewer than twenty threads. In various examples, threads 208 may be implemented in various ways. For example, threads 208 may be implemented in microcode. In other examples, threads 208 may be implemented in higher level code.

Processor 112A comprises one or more integrated circuits to execute software instructions. In various examples, processor 112A is implemented in various ways. For example, processor 112A may be implemented as one or more general-purpose processors or special-purpose processors, such as DSPs, ASICs, FPGAs, etc.

Processor 112A is coupled to FU memory 202 such that processor 112A is able to read data from and write data to FU memory 202. As illustrated in the example of FIG. 4, FU memory 202 stores a set of software instructions 226 and a forwarding unit (FU) FIFO 228. In some examples, software instructions 226 include microkernel instructions and user-level software instructions. Execution of the microkernel instructions by processor 112A causes processor 112A to provide a microkernel. The microkernel may provide a basic set of operating system services. Processor 112A may also execute the user-level software instructions to provide user-level software processes that utilize the operating system services of the microkernel. In various examples, the user-level software processes executing on processor 112A may perform various tasks. For example, the user-level software processes executing on processor 112A may configure PFEs 110, offload data transfer statistics from FU memory 202 to service units 14, and perform other tasks.

When IFC 108A receives a packet from content access network 8 or packet data network 10, IFC 108A provides the packet to one of PFEs 110. For ease of explanation, this disclosure assumes that IFC 108A provides the packet to PFE 110A. When PFE 110A receives the packet, packet buffer 216 may temporarily store the packet. Subsequently, distribution unit 214 assigns the packet to one of threads 208. For ease of explanation, this disclosure assumes that distribution unit 214 assigns the packet to thread 208A.

Figure 5:
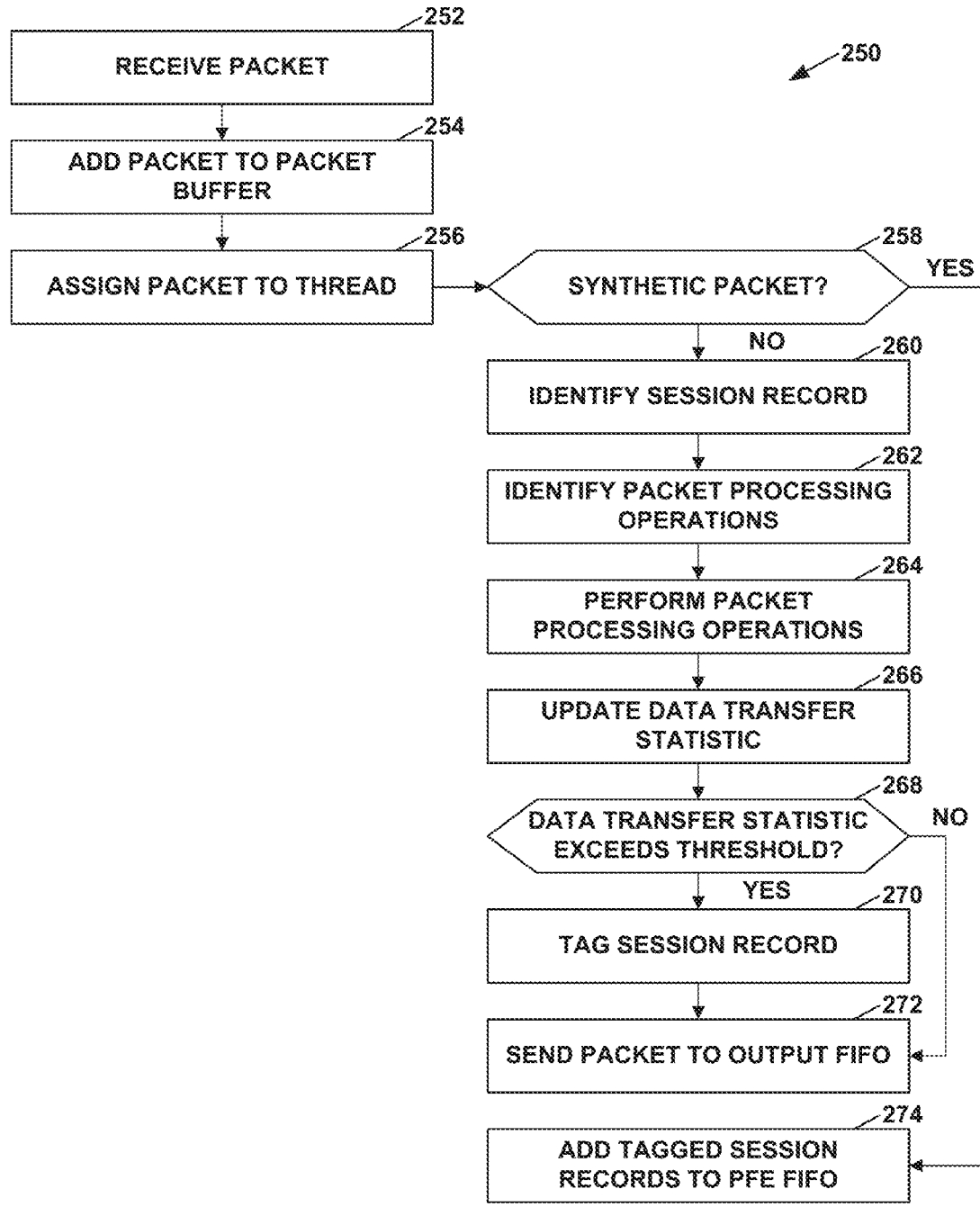
FIG. 5 is a flowchart that illustrates an example operation of a packet forwarding engine.

When distribution unit 214 assigns the packet to thread 208A, thread 208A may perform a datapath operation on the packet. In various examples, thread 208A may perform various datapath operations on the packet. FIG. 5, described below, is a flowchart that illustrates an example datapath. In other examples, thread 208A may perform datapath operations that are different than the example datapath operation shown in FIG. 5.

When thread 208A performs the datapath operation on the packet, thread 208A may attempt to identify a subscriber session associated with the packet. In various examples, thread 208A may attempt to identify a subscriber session associated with the packet in various ways. For example, each of session records 224 may be associated with a hash value. In this example, PFE 110A may comprise a hash engine that generates a hash value for the packet at least in part by executing a hash function on one or more elements of the packet. For instance, the hash engine may execute a hash function such as SHA-1 or MD5 on elements of the packet such as the source and destination addresses of the packet, port numbers specified by the packet, and so on. Thread 208A may then determine whether the hash value for the packet matches the hash value of a session record. If there is a match, the packet is associated with the subscriber session associated with the session record.

If thread 208A successfully identifies the subscriber session associated with the packet, thread 208A may perform one or more packet processing operations specified by the session record for the subscriber session. Different session records may specify different packet processing operations. For example, one or more of session records 224 may specify that a QoS operation is to be applied to the packet. In another example, one or more of session records 224 may specify that an operation to facilitate lawful intercept of the packet is to be performed on the packet.

Furthermore, the packet processing operations may include updating the identified session record such that the session record indicates an up-to-date data transfer statistic regarding the data exchanged by the subscriber. For example, the packet processing operations may include updating the data transfer statistic to indicate the current quantity of data exchanged by the subscriber over content access network 8 during the subscriber session. In this example, thread 208A may update the data transfer statistic by adding the quantity of data in the packet to the quantity of data indicated by the data transfer statistic.

Synthetic packet unit 218 provides synthetic packets to PFE 110A on a recurring basis. For example, the recurring basis may be a periodic basis with an interval of less than five seconds. For instance, synthetic packet unit 218 may provide a synthetic packet to PFE 110A every one or two seconds. In some examples, the synthetic packets have a packet type that is different than the packet types of packets received from content access network 8 or packet data network 10.

In response to receiving a synthetic packet, one of threads 208 at PFE 110A may perform a callout operation. When the thread performs the callout operation, the thread may iterate through session records 224. As the thread iterates through session records 224, the thread identifies ones of session records 224 that specify data transfer statistics that exceed a threshold. The thread may add the identified session records to PFE FIFO 220. Thus, the callout operation may add a session record to PFE FIFO 220 if the data transfer statistic exceeds a threshold, but does not add the session record to PFE FIFO 220 if the data transfer statistic does not exceed the threshold. Because the session records contain data transfer statistics, the thread effectively adds a data transfer statistic to PFE FIFO 220 if the data transfer statistic exceeds a threshold, and does not add the data transfer statistic to PFE FIFO 220 if the data transfer statistic does not exceed the threshold.

In various examples, the threshold may have a variety of values. For example, when one of service units 14 establishes a subscriber session, the service unit may configure the data transfer statistic to indicate a quantity of data that a subscriber has already transferred over content access network 8 during a billing period. In this example, PFE 110A may increase the data transfer statistic based on the quantity of data in each packet in the subscriber session. Furthermore, in this example, the threshold may be a quantity of data, such as four gigabytes, allowed by the subscriber's service plan. In another example, subscribers may receive data transfer quotas. In this example, the data transfer statistic may indicate a quantity of data remaining in the data transfer quota. In this example, the callout operation may determine that the data transfer statistic exceeds the threshold when the data transfer statistic drops below zero. Thus, the data transfer statistic may "exceed" the threshold in the sense that the data transfer statistic has moved past the threshold. In some examples, different subscribers may have different thresholds.

When the callout operation adds the session record to PFE FIFO 220, the callout operation may add all or parts of the session record to PFE FIFO 220. For example, the callout operation may add sufficient data to identify the subscriber session associated with the session record and the data transfer statistic to PFE FIFO 220. In this example, the callout operation may omit elements of the session record that indicate which packet processing operations to perform on packets in the session.

Figure 6:
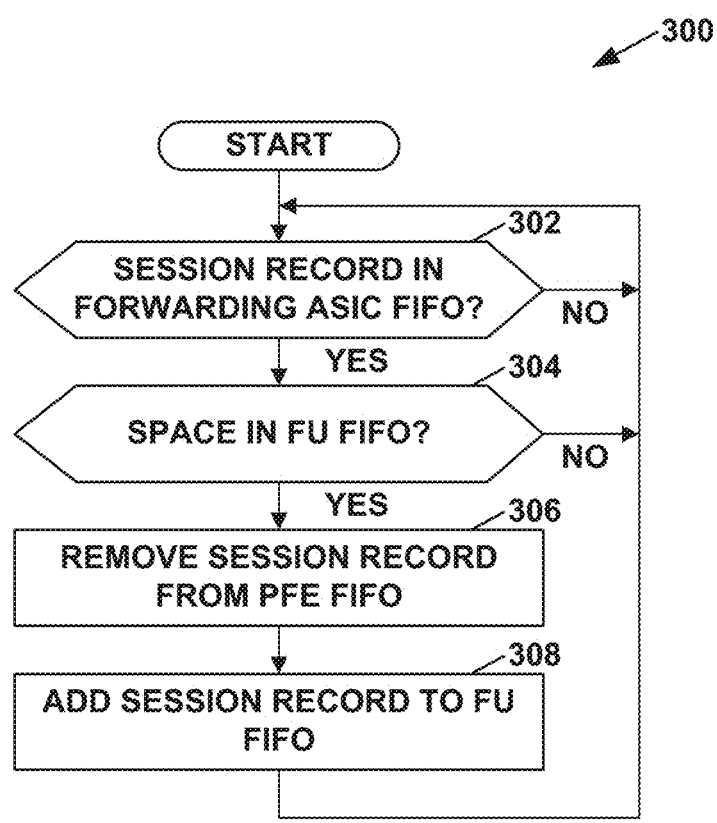
FIG. 6 is a flowchart that illustrates an example operation of a traffic offload engine.

TOE 212 pushes session records from PFE FIFO 220 to FU FIFO 228. Thus, TOE 212 is configured to move data transfer statistics from PFE FIFO 220 to FU FIFO 228 without first receiving a request to move session records from PFE FIFO 220 to FU FIFO 228. FIG. 6, described below, is a flowchart that illustrates an example operation of TOE 212. To push session records from PFE FIFO 220 to FU FIFO 228, TOE 212 determines whether there are any session records in PFE FIFO 220. If there is a record in PFE FIFO 220 and there is sufficient space in FU FIFO 228 for the session record. TOE 212 moves the session record from PFE FIFO 220 to FU FIFO 228. In other words, TOE 212 may remove the session record from PFE FIFO 220 and write the session record to an end of FU FIFO 228. In various examples, TOE 212 may write the session record to FU FIFO 228 in various ways. For instance, in some examples, TOE 212 may write the session record to FU FIFO 228 using direct memory access (DMA).

TOE 212 may determine whether there any records in PFE FIFO 220 in response to various events. For example, TOE 212 may poll PFE FIFO 220 on a periodic basis to determine whether there are any records in PFE FIFO 220. In another example, the callout operation may send a signal to TOE 212 whenever the callout operation adds a session record to PFE FIFO 220. Thus, TOE 212 does not necessarily determine whether there are records in PFE FIFO 220 in response to a request from processor 112A or another component of forwarding unit 16A outside PFE 110A.

In various examples, TOE 212 is implemented in various ways. For example, one or more special-purpose integrated circuits within PFE 110A may provide the functionality of TOE 212. In this example, the special-purpose integrated circuits that provide the functionality of TOE 212 may or may not be separate from the integrated circuits that provide the functionality of threads 208, distribution unit 214, and/or other functional components of PFE 110A.

As discussed above, one or more user-level software programs run on processor 112A. One or more of the user-level software programs determine whether there are any session records in FU FIFO 228. If there is a session record in FU FIFO 228, a user-level software program identifies one of service units 14 as being associated with the session record. In some examples, the user-level software program identifies the service unit associated with the session record based on data in the session record, such as a PDP address of a wireless device, an APN of a service, or other information in the session record.

After identifying the service unit associated with the session record, the user-level software program determines whether there is sufficient space in the service unit FIFO 230 associated with the session record. For ease of explanation, this disclosure assumes that service unit FIFO 230A is associated with the identified service unit. If there is sufficient space in service unit FIFO 230A, the user-level software program moves the session record from FU FIFO 228 to service unit FIFO 230A. In other words, the user-level software program removes the session record from FU FIFO 228 and writes the session record to service unit FIFO 230A.

One or more user-level software programs running on processor 112A may encapsulate session records in service unit FIFOs 230 into packets and send the packets over switch 104 to appropriate ones of service units 14. For example, service unit FIFO 230A may be associated with service unit 14A. In this example, a user-level software program may encapsulate a session record in service unit FIFO 230A within a TCP/IP packet for delivery to service unit 14A. In some examples, the user-level software programs only remove session records from service unit FIFOs 230 after receiving acknowledgements from service units 14 of successful receipt of the packets containing the session records. Thus, session records may remain in a service unit FIFO until the service unit associated with the service unit FIFO receives the session record. In some examples there is redundancy among service units 14. In such examples, a first service unit may be redundant with a second service unit. If a switchover occurs from the first service unit to the second service unit, the user-level software program may send one or more session records previously sent to the first service unit to the second service unit.

FIG. 5 is a flowchart illustrating an example operation 250 of PFE 110A. In some examples, other PFEs 110 in forwarding unit 16A and other ones of forwarding units 16 may perform operation 250. PFE 110A may start operation 250 in response to receiving a packet from IFC 108A (252). Upon receiving the packet, PFE 110A may store the packet in packet buffer 216 (254). When one of threads 208 finishes performing packet processing operations on an earlier packet, distribution unit 214 may assign an earliest-received packet in packet buffer 216 to the thread (256). In other words, distribution unit 214 may be configured to assign a packet to a thread in response to receiving the packet. For ease of explanation, this disclosure assumes that distribution unit 214 assigns the packet to thread 208A.

When distribution unit 214 assigns the packet to thread 208A, thread 208A determines whether the packet is a synthetic packet (258). In some examples, thread 208A determines whether the packet is a synthetic packet based on a packet type of the packet. If the packet is not a synthetic packet ("NO" of 258), thread 208A performs a datapath operation on the packet. As part of performing the datapath operation on the packet, thread 208A identifies one of session records 224 as being associated with the packet (260). Thus, thread 208 may identify a subscriber session associated with the packet in response to receiving the packet. Thread 208A identifies, based on the session record associated with the packet, one or more packet processing operations to perform with regard to the packet (262). Thread 208A may perform the identified packet processing operations with regard to the packet (264). In various instances, thread 208A may perform various packet processing operations with regard to the packet. For example, the packet processing operations may include identifying a next hop for the packet. In this example, thread 208A may use data from FIB 222 to identify the next hop for the packet.

For ease of explanation, the example of FIG. 5 assumes that the identified packet processing operations include a packet processing operation to update a data transfer statistic in the session record. As part of performing the identified packet processing operations, thread 208A updates the data transfer statistic based on a quantity of data in the packet (266). In the example of FIG. 5, thread 208A determines whether the data transfer statistic exceeds a threshold (268). If the data transfer statistic exceeds the threshold ("YES" of 268), thread 208A tags the session record for export (270). After performing the packet processing operations with regard to the packet or after determining that the data transfer statistic does not exceed the threshold ("NO" of 268), thread 208A may send the packet to an output FIFO for delivery to the next hop for the packet (272).

If thread 208A determines that the packet is a synthetic packet ("YES" of 258), thread 208A performs a callout operation. As part of performing the callout operation, thread 208A iterates through session records 224 and adds the session records tagged for export to PFE FIFO 220 (274). In some examples, other ones of threads 208 may read from and/or write to shadow copies of session records 224 while thread 208 is iterating through session records 224 and adding tagged session records to PFE FIFO 220.

In other examples, thread 208A does not determine whether the data transfer statistic exceeds the threshold or tag session records for export when the packet is not a synthetic packet. Rather, in some such examples, thread 208A determines whether the data transfer statistics of session records 224 exceed the thresholds after determining that the packet is a synthetic packet.

FIG. 6 is a flowchart that illustrates an example operation 300 of TOE 212. After TOE 212 starts operation 300, TOE 212 determines whether PFE FIFO 220 contains a session record (302). If TOE 212 determines that PFE FIFO 220 contains a session record ("YES" of 302), TOE 212 determines whether FU FIFO 228 has sufficient space to store the session record (304). If TOE 212 determines that FU FIFO 228 has sufficient space to store the session record ("YES" of 304), TOE 212 remove the session record from PFE FIFO 220 (306). Furthermore, if TOE 212 determines that FU FIFO 228 has sufficient space to store the session record, TOE 212 adds the session record to FU FIFO 228 (308). After adding the session record to FU FIFO 228, after determining that there is not sufficient space in FU FIFO 228 to store the session record ("NO" of 304), or after determining that there are no session records in PFE FIFO 220 ("NO" of 302), TOE 212 may perform operation 300 again. Thus, if there is not sufficient space in FU FIFO 228 to store the session record, TOE 212 may wait until there is sufficient space in FU FIFO 228 before copying the record from the PFE FIFO 220 to the FU FIFO 228.

Figure 7:
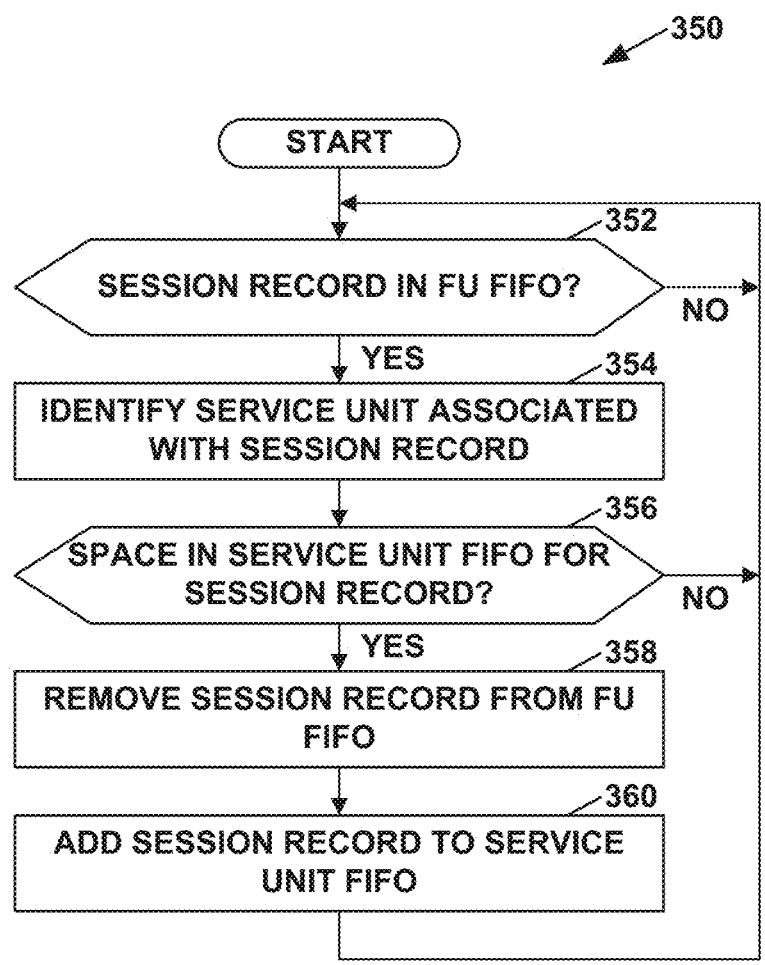
FIG. 7 is a flowchart that illustrates an example operation of a user-level software program running on a processor of the forwarding unit.

FIG. 7 is a flowchart that illustrates an example operation 350 of a user-level software program running on processor 112A of forwarding unit 16A. Operations similar to operation 350 may be performed by user-level software programs running on processors of other ones of forwarding units 16.

After the user-level software program starts operation 350, the user-level software program determines whether there is a session record in FU FIFO 228 (352). If there is a session record in FU FIFO 228 ("YES" of 352), the user-level software program identifies one of service units 14 as being associated with the session record (354). For instance, the user-level software program may identify a service unit that anchors the subscriber session associated with the session record. Next, the user-level software program determines whether there is sufficient space for the session record in the service unit FIFO 230 associated with the identified service unit (356). In other words, the user-level software program may determine whether there is sufficient space in the FIFO for a record that contains a data transfer statistic.

If there is sufficient space for the session record in the service unit FIFO 230 associated with the identified service unit ("YES" of 356), the user-level software program removes the session record from FU FIFO 228 (358). In addition, the user-level software program adds the session record to the session unit FIFO associated with the identified service unit (360). In this way, the user-level software program may copy the session record from FU memory 202 to the service unit FIFO if there is sufficient space in the service unit FIFO for the session record.

After adding the session record to the session unit FIFO, after determining that there is not sufficient space for the session record in the session unit FIFO ("NO" of 356), or after determining that there are no session records in the FU FIFO 228 ("NO" of 352), the user-level software program may perform operation 350 again. Thus, if there is not sufficient space in the service unit FIFO, the user-level software program may wait until there is sufficient space in the service unit FIFO before copying the record from the FU FIFO 228 to the service unit FIFO. In this way, PFE FIFO 220, FU FIFO 228, and service unit FIFOs 230 may implement a system that applies back pressure to delay sending data transfer statistics to the service unit if the service unit is unable to accept the data transfer statistics.

In some examples, FU memory 202 stores FU FIFO 228 and service unit FIFOs 230. FU memory 202 may be significantly larger than PFE memories 210 in PFEs 110. Thus, FU FIFO 228 and service units FIFOs 230 may store significantly more session records than PFE FIFOs 220 in PFEs 110. In the event of back pressure from one or more of service units 14 (i.e., when one or more of service units 14 are unable to accept data transfer statistics), processor 112A may modify one or more session records stored in FU memory 202. For example, thresholds can be crossed multiple times for a session. Consequently, FU memory 202 may store two or more session records related to the same session. In this example, processor 112A may consolidate session records related to the same session into a single session record by adding the data transfer statistics of the session records. Processor 112A may store the resulting record in FU FIFO 228 or service unit FIFOs 230 in FU memory 202.

In this way, a non-transitory computer-readable medium, such as FU memory 202, may comprise instructions for causing one or more programmable processors, such as processor 112A, to copy a data transfer statistic from a memory of a forwarding unit of a mobile access gateway to a FIFO associated with a service unit of the mobile access gateway, the data transfer statistic based on a quantity of data transferred in a subscriber session, the data transfer statistic being updated by a PFE of the forwarding unit and pushed by the forwarding unit into the memory of the forwarding unit.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general- or special-purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method for offloading a data transfer statistic from a packet forwarding engine (PFE) forming part of a forwarding unit in a mobile access gateway, the method comprising:
    receiving, at the forwarding unit of the mobile access gateway, packets associated with a subscriber session for a subscriber;
    updating, by the PFE, the data transfer statistic based on quantities of data in the received packets, the data transfer statistic stored in a memory within the PFE;
    generating, by the mobile access gateway, synthetic packets, the synthetic packets having a packet type different than packet types of any packets received by the forwarding unit from a content access network or a packet data network; and
    responsive to determining a packet is a synthetic packet, performing, by the PFE, a callout operation to push the data transfer statistic from the memory of the PFE to a memory of the forwarding unit, the memory of the forwarding unit being separate from the memory within the PFE.

2. The method of claim 1, wherein performing the callout operation comprises:
    adding the data transfer statistic to a first FIFO if the data transfer statistic exceeds a threshold and not adding the data transfer statistic to the first FIFO if the data transfer statistic does not exceed the threshold, the first FIFO being in the memory of the PFE; and
    moving the data transfer statistic from the first FIFO to a second FIFO, the second FIFO being in the memory of the forwarding unit.

3. The method of claim 1, wherein generating the synthetic packets comprises generating the synthetic packets on a periodic basis with an interval of less than five seconds.

4. The method of claim 1, wherein the packet is a first packet and method further comprises assigning, at the PFE, a second packet to a thread in response to receiving the second packet, the thread performing packet processing operations with regard to the second packet, the packet processing operations including updating the data transfer statistic based on the quantity of data in the second packet.

5. The method of claim 4,
    wherein the packet processing operations include identifying a next hop for the second packet; and
    wherein the method further comprises forwarding the second packet to the identified next hop for the second packet.

6. The method of claim 1, further comprising:
    identifying a service unit associated with the subscriber; and
    moving the data transfer statistic from the memory of the forwarding unit to the identified service unit.

7. The method of claim 6, further comprising sending data based on the data transfer statistic from the identified service unit to a billing gateway.

8. The method of claim 6,
    wherein the forwarding unit includes a FIFO associated with the identified service unit; and
    wherein the method further comprises:
        determining whether there is sufficient space in the FIFO associated with the identified service unit for a record containing the data transfer statistic;

if there is sufficient space in the FIFO associated with the identified service unit, copying the record from the memory of the forwarding unit to the FIFO associated with the identified service unit; and if there is not sufficient space in the FIFO associated with the identified service unit, waiting until there is sufficient space in the FIFO associated with the identified service unit before copying the record from the memory of the forwarding unit to the FIFO associated with the identified service unit.

9. The method of claim 8, wherein the FIFO associated with the identified service unit is a first FIFO, the memory of the PFE contains a second FIFO, and the memory of the forwarding unit contains a third FIFO; and wherein pushing the data transfer statistic from the memory of the PFE to the memory of the forwarding unit comprises:

adding the record to the second FIFO;

determining, at the PFE, whether there is sufficient space in the third FIFO for the record;

if there is sufficient space in the third FIFO for the record, copying the record from the second FIFO to the third FIFO; and if there is not sufficient space in the third FIFO for the record, waiting until there is sufficient space in the third FIFO before copying the record from the second FIFO to the third FIFO.

10. The method of claim 8, further comprising executing software instructions at a microprocessor of the forwarding unit, execution of the software instructions causing the forwarding unit to identify the service unit associated with the subscriber, determine whether there is sufficient space in the FIFO associated with the identified service unit, and copy the record from the memory of the forwarding unit to the FIFO associated with the identified service unit.

11. The method of claim 1, wherein the packet is a first packet, the method further comprising identifying a subscriber session associated with a second packet in response to receiving the second packet, the data transfer statistic indicating an amount of data exchanged by the subscriber during the subscriber session.

12. The method of claim 1, wherein the PFE is an application-specific integrated circuit (ASIC).

13. A mobile access gateway comprising a forwarding unit that comprises:

a forwarding unit memory;

a synthetic packet unit configured to generate synthetic packets, the synthetic packet having a packet type different than packet types of any packets received by the forwarding unit from a content access network or a packet data network; and a packet forwarding engine (PFE) that comprises:

a PFE memory that stores a data transfer statistic, the PFE memory being separate from the forwarding unit memory, the PFE memory comprising a first FIFO, wherein the PFE is configured to:

receive packets associated with a subscriber session;

update the data transfer statistic based on quantities of data in the received packets; and responsive to determining a packet is a synthetic packet, perform a callout operation to push the data transfer statistic from the PFE memory to the forwarding unit memory.

14. The mobile access gateway of claim 13, wherein the forwarding unit memory comprises a second FIFO; and wherein the PFE comprises:

hardware configured to execute a thread that performs the callout operation in response to receiving the synthetic packet, the callout operation adding the data transfer statistic to the first FIFO if the data transfer statistic exceeds a threshold, the callout operation not adding the data transfer statistic to the first FIFO if the data transfer statistic does not exceed the threshold; and a traffic offload engine (TOE) configured to move the data transfer statistic from the first FIFO to the second FIFO.

15. The mobile access gateway of claim 14, wherein the packet is a first packet and the PFE includes a distribution unit configured to assign a second packet to the thread in response to receiving the second packet, the thread performing packet processing operations with regard to the second packet, the packet processing operations including updating the data transfer statistic based on the quantity of data in the second packet and identifying a next hop for the second packet.

16. The mobile access gateway of claim 13, wherein the mobile access gateway further comprises a plurality of service units, the plurality of service units including a service unit associated with the subscriber session;

wherein the forwarding engine comprises a processor that executes software instructions that cause the processor to identify the service unit associated with the subscriber session and to send the data transfer statistic to the identified service unit; and wherein the service unit associated with the subscriber session is configured to send data based on the data transfer statistic to a billing gateway.

17. The mobile access gateway of claim 16, wherein the forwarding unit comprises a FIFO associated with the identified service unit; and wherein execution of the software instructions on the processor causes the processor to:

determine whether there is sufficient space in the FIFO for a record that contains the data transfer statistic, and copy the record from the forwarding unit memory to the FIFO if there is sufficient space in the FIFO for the record.

18. The mobile access gateway of claim 17, wherein the FIFO associated with the identified service unit is a first FIFO;

wherein the forwarding unit memory comprises a second FIFO;

wherein the PFE memory comprises a third FIFO, the third FIFO containing the record; and wherein the PFE comprises a traffic offload engine (TOE) that is configured to:

determine whether there is sufficient space in the second FIFO to store the record;

if there is sufficient space in the second FIFO to store the record, copy the record from the third FIFO to the second FIFO; and if there is not sufficient space in the second FIFO to store the record, waiting until there is sufficient space in the second FIFO before copying the record from the second FIFO to the second FIFO.

19. The mobile access gateway of claim 13, wherein the PFE is an application-specific integrated circuit (ASIC).

20. A non-transitory computer-readable medium comprising instructions for configuring a packet forwarding engine (PFE) forming part of a forwarding unit in a mobile access gateway to:
- receive, at the forwarding unit of the mobile access gateway, packets associated with a subscriber session for a subscriber;
- update a data transfer statistic based on quantities of data in the received packets, the data transfer statistic stored in a memory within the PFE;
- generate synthetic packets, the synthetic packets having a packet type different than packet types of any packets received by the forwarding unit from a content access network or a packet data network; and
- responsive to determining a packet is a synthetic packet, perform a callout operation to push the data transfer statistic from the memory within the PFE to a memory of the forwarding unit, the memory of the forwarding unit being separate from the memory within the PFE.

* * * * *